(12) United States Patent
Xu et al.

(10) Patent No.: US 11,367,877 B1
(45) Date of Patent: Jun. 21, 2022

(54) AQUEOUS BATTERY CURRENT COLLECTORS

(71) Applicant: Apple Inc., Cupertino, CA (US)

(72) Inventors: Wang Xu, Sunnyvale, CA (US); Steven Kaye, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/538,660

(22) Filed: Aug. 12, 2019

Related U.S. Application Data (60) Provisional application No. 62/733,206, filed on Sep. 19, 2018.

(51) Int. Cl.
*H01M 4/00* (2006.01)
*H01M 4/66* (2006.01)
*H01M 10/26* (2006.01)

(52) U.S. Cl.
CPC .......... *H01M 4/661* (2013.01); *H01M 10/26* (2013.01); *H01M 2300/0014* (2013.01)

(58) Field of Classification Search
CPC ....... H01M 4/502; H01M 10/44; H01M 4/131
See application file for complete search history.

(56) References Cited

U.S. PATENT DOCUMENTS

| | | | |
|---|---|---|---|
| 5,162,169 A | 11/1992 | Tomantschger et al. | |
| 5,162,172 A | 11/1992 | Kaun | |
| 5,254,415 A | 10/1993 | Williams et al. | |
| 5,367,431 A | 11/1994 | Kunishi et al. | |
| 5,837,158 A | 11/1998 | Shepodd et al. | |
| 8,153,410 B2 | 4/2012 | Jaffe | |
| 8,163,410 B2 | 4/2012 | Fulop et al. | |
| 11,189,855 B1 | 11/2021 | O'Neill et al. | |
| 11,228,074 B2 | 1/2022 | Kaye et al. | |
| 2001/0038939 A1 | 11/2001 | Bailey | |
| 2005/0106456 A1 | 5/2005 | Puester et al. | |
| 2006/0097701 A1 | 5/2006 | Kodama et al. | |
| 2008/0187824 A1* | 8/2008 | Tomantschger ...... | H01M 4/667 429/122 |

(Continued)

FOREIGN PATENT DOCUMENTS

| | | |
|---|---|---|
| CN | 1439180 A | 8/2003 |
| CN | 102473984 A | 5/2012 |

(Continued)

OTHER PUBLICATIONS

PCT/US2018/033218, "International Preliminary Report on Patentability", dated Nov. 28, 2019, 9 pages.

(Continued)

*Primary Examiner* — Cynthia H Kelly
*Assistant Examiner* — Monique M Wills
(74) *Attorney, Agent, or Firm* — Kilpatrick Townsend & Stockton, LLP (57) ABSTRACT

Energy storage devices, battery cells, and batteries of the present technology may include a first current collector including a material characterized by a maximum corrosion current in an aqueous electrolyte below or about 2 $mA/cm^2$. The batteries may include a cathode material coupled with the first current collector. The batteries may include a second current collector, and may include an anode material coupled with the second current collector. The batteries may also include an aqueous electrolyte characterized by a pH greater than or about 14.

20 Claims, 3 Drawing Sheets

(56) References Cited

U.S. PATENT DOCUMENTS

| | | | |
|---|---|---|---|
| 2009/0068531 A1 | 3/2009 | Sawa et al. | |
| 2011/0014532 A1 | 1/2011 | Knuckey et al. | |
| 2011/0294007 A1 | 12/2011 | Hosaka et al. | |
| 2012/0189896 A1 | 7/2012 | Zhou et al. | |
| 2012/0263995 A1 | 10/2012 | Naito et al. | |
| 2013/0065106 A1 | 3/2013 | Faust | |
| 2014/0127542 A1 | 5/2014 | Li et al. | |
| 2014/0154542 A1 | 6/2014 | Issaev et al. | |
| 2014/0178735 A1 | 6/2014 | Wang et al. | |
| 2015/0200393 A1 | 7/2015 | Li et al. | |
| 2015/0236543 A1 | 8/2015 | Brushett et al. | |
| 2015/0280259 A1 | 10/2015 | Anderson et al. | |
| 2016/0049679 A1 | 2/2016 | Stevens et al. | |
| 2016/0197352 A1 | 7/2016 | Blaser et al. | |
| 2016/0248113 A1 | 8/2016 | He et al. | |
| 2017/0133689 A1 | 5/2017 | Moore et al. | |
| 2017/0250434 A1 | 8/2017 | Gennett et al. | |
| 2018/0079721 A1 | 3/2018 | Armand et al. | |
| 2018/0097248 A1 | 4/2018 | Nariyama et al. | |
| 2018/0175427 A1 | 6/2018 | Nariyama | |
| 2018/0175470 A1 | 6/2018 | Bai et al. | |
| 2018/0294454 A1 | 10/2018 | Mackenzie et al. | |
| 2018/0316063 A1 | 11/2018 | Masel et al. | |
| 2019/0036147 A1 | 1/2019 | Yuan et al. | |
| 2020/0212440 A1* | 7/2020 | Kolhekar | H01M 4/50 |
| 2021/0028457 A1 | 1/2021 | Newhouse et al. | |

FOREIGN PATENT DOCUMENTS

| | | |
|---|---|---|
| CN | 103650216 A | 3/2014 |
| CN | 104779412 A | 7/2015 |
| EP | 1125336 A1 | 8/2001 |
| EP | 2892097 A1 | 7/2015 |
| EP | 3435473 A1 | 1/2019 |
| JP | 6435864 A | 2/1989 |
| JP | 0562683 A | 3/1993 |
| JP | 3522303 B2 | 5/1993 |
| JP | 2006012556 A | 1/2006 |
| JP | 2009224097 A | 10/2009 |
| JP | 5410822 B2 | 2/2014 |
| JP | 2014029818 A | 2/2014 |
| WO | 8504287 A1 | 9/1985 |
| WO | 2010111087 A1 | 9/2010 |
| WO | 2017007827 A1 | 1/2017 |
| WO | 2018057566 A1 | 3/2018 |
| WO | 2018195372 A1 | 10/2018 |
| WO | 2018213601 A2 | 11/2018 |
| WO | 2019023010 A1 | 1/2019 |
| WO | 2019245461 A1 | 12/2019 |

OTHER PUBLICATIONS

PCT/US2018/042598, "International Preliminary Report on Patentability", dated Feb. 6, 2020, 10 pages.
Europe Patent Application No. 16738994.9, "Communication Pursuant to Rules 161(1) and 162 EPC", dated Mar. 23, 2018, 3 pages.
Japan Patent Application No. 2018-500449, "Office Action", dated Jan. 21, 2019, 12 pages.
Korea Patent Application No. 10-2018-7000263, "Office Action", dated Feb. 28, 2019, 5 pages.
PCT/US2016/041151, "International Preliminary Report on Patentability", dated Jan. 18, 2018, 8 pages.
PCT/US2016/041151, "International Search Report and Written Opinion", dated Aug. 25, 2016, 10 pages.
PCT/US2017/052413, "International Preliminary Report on Patentability", dated Apr. 4, 2019, 12 pages.
PCT/US2017/052413, "International Search Report and Written Opinion", dated Feb. 1, 2018, 19 pages.
PCT/US2017/052413, "Invitation to Pay Additional Fees and, Where Applicable, Protest Fee", dated Dec. 8, 2017, 14 pages.
PCT/US2018/028472, "International Search Report and Written Opinion", dated Jul. 27, 2018, 13 pages.
PCT/US2018/033218, "International Search Report and Written Opinion", dated Nov. 16, 2018, 13 pages.
PCT/US2018/042598, "International Search Report and Written Opinion", dated Oct. 2, 2018, 14 pages.
U.S. Appl. No. 16/855,170, "Non-Final Office Action", dated Jul. 27, 2021, 13 pages.
U.S. Appl. No. 16/683,088, "Non-Final Office Action", dated Sep. 2, 2021, 10 pages.
U.S. Appl. No. 16/683,091 "Non-Final Office Action", dated Aug. 18, 2021, 22 pages.
Boeva et al., "Soluble and Highly Ionically Conducting Interpolyelectrolyte Complexes Prepared via Chemical Template Polymerization of Aniline in the Presence of Perfluorinated Polysulfonic Acid", The Royal Society of Chemistry; vol. 4, 2014, pp. 56677-56681.
Thuc,"Study on Synthesis and Characterization of Anion Exchange Membrane Based on Poly (Vinyl Alcohol) Modified by Freeradical Polymerization", International Journal of Electrochemical Science; vol. 15, 2020, pp. 8190-8199.
U.S. Appl. No. 16/245,542, "Non-Final Office Action", dated May 11, 2021, 14 pages.
U.S. Appl. No. 16/748,586, "Non-Final Office Action", dated May 14, 2021, 12 pages.
PCT/US2020/060348, "International Search Report and Written Opinion", dated Mar. 12, 2021, 9 pages.
PCT/US2020/060350, "International Search Report and Written Opinion", dated Mar. 12, 2021, 12 pages.
Weng, et al., "Three-Electrolyte Electrochemical Energy Storage Systems Using Both Anion- and Cation-Exchange Membranes as Separators", Energy, vol. 167, Jan. 15, 2019, pp. 1-32.
U.S. Appl. No. 16/245,542, "Notice of Allowance", dated Dec. 17, 2021, 5 pages.
U.S. Appl. No. 16/683,088, "Final Office Action", dated Oct. 12, 2021, 12 pages.
U.S. Appl. No. 16/683,088, "Notice of Allowance", dated Nov. 22, 2021, 8 pages.
U.S. Appl. No. 16/748,586, "Final Office Action", dated Nov. 15, 2021, 11 pages.
U.S. Appl. No. 16/855,170, "Notice of Allowance", dated Sep. 24, 2021, 9 pages.
China Patent Application No. 201880047002.2, "Office Action", dated Nov. 24, 2021, 16 pages.
U.S. Appl. No. 16/748,586, Notice of Allowance, dated Feb. 2, 2022, 8 pages.
U.S. Appl. No. 16/796,430, Non-Final Office Action, dated Feb. 11, 2022, 23 pages.

* cited by examiner

AQUEOUS BATTERY CURRENT COLLECTORS

CROSS-REFERENCE TO RELATED APPLICATION

This application claims the benefit of U.S. Application Ser. No. 62/733,206, filed Sep. 19, 2018, the disclosure of which is hereby incorporated by reference in its entirety for all purposes.

TECHNICAL FIELD

The present technology relates to batteries and battery components. More specifically, the present technology relates to current collectors operable in aqueous battery cell designs.

BACKGROUND

In batteries, current collector materials may affect operation and cycling capabilities. While certain materials may operate adequately electrically, the materials may also exacerbate detrimental effects, such as hydrogen generation.

SUMMARY

The present technology relates to energy storage devices, including battery cells and batteries, which may include zinc alkaline batteries having a variety of shapes including wound cells, cylindrical, prismatic, and stacked cells, which may be or include batteries stacked in any orientation including vertical and horizontal, for example. These devices may include current collectors characterized by one or more characteristics including corrosion resistance, reduction in development of hydrogen, oxygen, or other gases, as well as facility in plating and stripping metal. The cells may include a host of features and material configurations as will be described throughout this disclosure.

Energy storage devices, battery cells, and batteries of the present technology may include a first current collector including a material characterized by a maximum corrosion current in an aqueous electrolyte below or about 2 $mA/cm^2$. The cells may also be characterized by a minimum corrosion rate over time of less than or about 5 µm/year. The batteries may include a cathode material coupled with the first current collector. The batteries may include a second current collector, and may include an anode material coupled with the second current collector. The batteries may also include an aqueous electrolyte characterized by a pH greater than or about 14.

In some embodiments, the first current collector may be or include a material selected from the group including magnesium, tin, yttrium, tantalum, or indium. The anode material may be or include a zinc-containing material. The cathode material may be or include a manganese-containing material, a nickel-containing material, or a silver-containing material. The cathode active material may also include copper. The first current collector may be characterized by a copper stripping current in the aqueous electrolyte greater than or about 0.01 $mA/cm^2$. The batteries may include a KOH solution as the aqueous electrolyte of the battery, and the KOH solution may be characterized by a pH of greater than or about 14. The aqueous electrolyte may include one or more additives selected from the group consisting of oxides, hydroxides, fluorides, chlorides, bromides, amides, nitrides, or phosphates.

The second current collector may be or include a material selected from the group including lead, copper, magnesium, niobium, yttrium, tantalum, or silver. The second current collector may be characterized by a hydrogen evolution current in the aqueous electrolyte below or about 50 $mA/cm^2$. The second current collector may be characterized by a maximum corrosion current in the aqueous electrolyte below or about 20 $mA/cm^2$. The second current collector may be characterized by a zinc stripping current in the aqueous electrolyte greater than or about 0.1 $mA/cm^2$. The first current collector or the second current collector may be or include a first material alloyed with or plated on a second material.

Some embodiments of the present technology encompass battery cells that may include a first current collector with a cathode material coupled with the first current collector. The battery cells may include a second current collector comprising a material characterized by a maximum corrosion current in an aqueous electrolyte below or about 20 $mA/cm^2$. An anode material may be coupled with the second current collector. The battery cells may also include an aqueous electrolyte characterized by a pH greater than or about 14.

In some embodiments, the second current collector may be or include a material selected from the group including lead, copper, magnesium, niobium, yttrium, tantalum, or silver. The second current collector may be characterized by a hydrogen evolution current in the aqueous electrolyte below or about 10 $mA/cm^2$. The second current collector may be characterized by a zinc plating current in the aqueous electrolyte greater than or about 0.4 $mA/cm^2$. The first current collector may be or include a material selected from the group including magnesium, tin, yttrium, tantalum, or indium. The aqueous electrolyte may include a KOH solution including one or more additives selected from the group including oxides, hydroxides, fluorides, chlorides, bromides, amides, nitrides, or phosphates.

Some embodiments of the present technology may also encompass battery cells including a first current collector characterized by a maximum corrosion current in an aqueous electrolyte below or about 2 $mA/cm^2$. A cathode material may be coupled with the first current collector. The battery cells may also include a second current collector including a material characterized by a hydrogen evolution current in the aqueous electrolyte below or about 50 $mA/cm^2$. An anode material may be coupled with the second current collector. The battery cells may also include an aqueous electrolyte characterized by a pH greater than or about 14. In some embodiments, the first current collector may be or include a material selected from the group including magnesium, tin, yttrium, tantalum, gold, or indium. The second current collector may be or include a material selected from the group including lead, copper, magnesium, niobium, yttrium, tantalum, or silver.

Such technology may provide numerous benefits over conventional technology. For example, the present devices may improve cycling capability by reducing corrosion in an alkaline environment. Additionally, the designs may provide reductions in gas generation at operating potentials. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may be made from a host of materials. For example, alkaline batteries may include electrochemical cells in which the electrolyte may be a concentrated aqueous solution of potassium hydroxide or hydroxides of other Group I or alkali metals. Similar to other battery cell designs, the composite may include a positive electrode and negative electrode with a separator disposed between them to prevent electrical shorting, while allowing ionic transport. The electrodes may include an active material disposed on a current collector that is configured to deliver and receive electrons. The current collectors may also operate as a substrate for the plating and stripping of metal ions during the reactions occurring during cell charging and discharging.

To operate effectively, the current collectors may be a conductive material, and may be or include metal. The alkaline environment may corrode these metals over time, and the metals themselves may affect side reactions as well as more thermodynamically efficient reactions within the cell, such as gas generation. Many conventional current collectors form a passivation layer when in contact with the alkaline electrolyte, which allows operation of the battery. This may often effectively allow the cell to operate a single time, i.e., as a primary battery. However, many conventional battery cell designs may degrade the passivation layer on the current collector causing rapid corrosion and failure of the current collector, halting charging and discharging operations. Additionally, when modifications are made in an attempt to mitigate corrosion, the batteries often fail to plate and strip metal effectively, or produce excessive amounts of hydrogen or oxygen, producing alternative failure modes that again limit the cycling capabilities.

The present technology overcomes these issues by utilizing materials characterized by reduced corrosion in an alkaline environment, while additionally providing adequate plating/stripping capabilities and/or reduced gas generation. The materials may be used in combinations that provide improved benefits over conventional designs, and allow cycling over an order of magnitude better than conventional designs.

Although the remaining portions of the description will routinely reference batteries with an alkaline electrolyte, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

Figure 1:
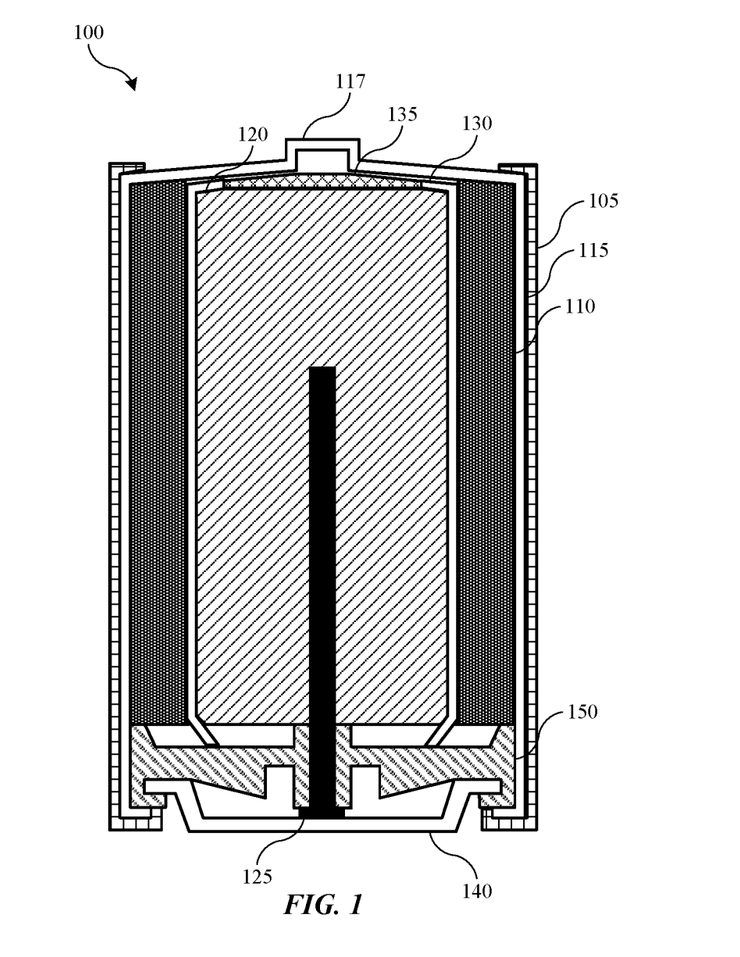
FIG. 1 shows a schematic cross-sectional view of an energy storage device according to some embodiments of the present technology.

FIG. 1 shows a schematic cross-sectional view of an energy storage device 100 according to embodiments of the present technology. FIG. 1 illustrates a cylindrical battery, which may be an alkaline battery in embodiments. It is to be understood that the battery form is exemplary, and other wound or layered batteries may include similar components including pouch or prismatic cells, which may similarly be used with the present technology. Energy storage device 100 may include an outer casing 105 that contains the components of energy storage device 100. Within outer casing 105 may be a cathode active material 110, which may be in contact with a cathode current collector 115. Cathode current collector 115 may be coupled with an additional conductive element, or may form positive terminal 117 of energy storage device 100. Cathode current collector 115 may be stainless steel, or some other conductive material suitable for electronic transmission as will be described below. Energy storage device 100 may also include an anode active material 120, which may be in contact with an anode current collector 125.

Anode current collector 125 may form or be coupled with an additional conductive element forming negative terminal 140. Anode current collector 125 may be brass, or some other conductive material suitable for electronic transmission as will be described below. A separator 130 may be positioned between cathode active material 110 and anode active material 120 to prevent short circuiting between the materials. A portion of separator 130 or a separate insulator 135 may be disposed connected with the separator 130 to further limit contact of the negative anode material 120 with the positive terminal 117. Additionally, an insulator 150 may be positioned between the anode current collector 125 and the cathode active material 110 and the cathode current collector 115. Insulator 150 may be composed of a flexible material to allow gas expansion within the cell during operation.

In embodiments, energy storage device 100 may be an alkaline battery or battery cell, and may include any number of materials associated with such cells. For example, anode active material 120 may include metals or metal-containing material, such as materials including poor metals including group 12, 13, 14, and 15 metals, including aluminum, cadmium, mercury, or zinc, for example. Cathode active material 110 may include materials including transition metals including manganese, nickel, or silver. For example, cathode compounds may include manganese dioxide, including alpha, beta, delta, or gamma manganese dioxide. Exemplary compounds may also include nickel hydroxide, including alpha or beta nickel hydroxide, and nickel oxide hydroxide. Exemplary compounds may also include silver hydroxide, among other metal oxides or hydroxides.

Cathode active material 110 may also include a mixture of materials including a carbon-containing material. Separator 130 may include a polymeric material such a polyolefin, including polyethylene or polypropylene. The separator 130 may also include a cellulosic material or a paper. Energy storage device 100 may include a potassium hydroxide electrolyte, which may be a concentrated aqueous solution. Although included as an electrolyte, the potassium hydroxide may not be involved in the cathode and anode reactions, which may produce balanced amounts of hydroxide. Separator 130 may allow hydroxide ions and water to diffuse across the separator 130, while limiting electrical transmission and transmission of cations, such as zinc or manganese ions from the electrodes, from being transported across the separator 130, which may cause one or more of the issues previously described.

As noted, the cathode and anode active materials may be or include a host of materials. The following description will be based on use of manganese cathode materials as well as zinc anode materials, although it is to be understood that additional materials may similarly be included having particular reaction mechanics as would be understood for those materials. Additionally, the cathode and anode materials may include a number of other materials within the active material, which may include, for example, lead, potassium, barium, boron, iron, copper, or other materials. In some embodiments, the manganese dioxide of the cathode active material may be a combination of certain forms of manganese dioxide, and the manganese dioxide may be substantially delta manganese dioxide in embodiments. The batteries or energy storage device 100 may also include an electrolyte having alkaline characteristics including a pH of above 7. The electrolyte may include water and potassium hydroxide and may be characterized by a hydroxide ion concentration of up to or about 0.5 M, up to or about 1 M, which may be equivalent to a pH of 14, up to or about 2 M, up to or about 3 M, which may be equivalent to a pH approaching 14.5, up to or about 5 M, up to or about 7 M, up to or about 9 M, up to or about 10 M, which may be equivalent to a pH of 15, or higher.

Figure 2:
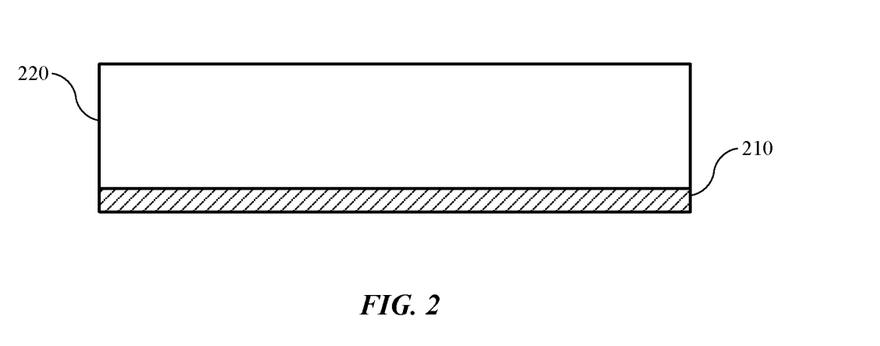
FIG. 2 shows a schematic cross-sectional view of an electrode according to some embodiments of the present technology.
Figure 3:
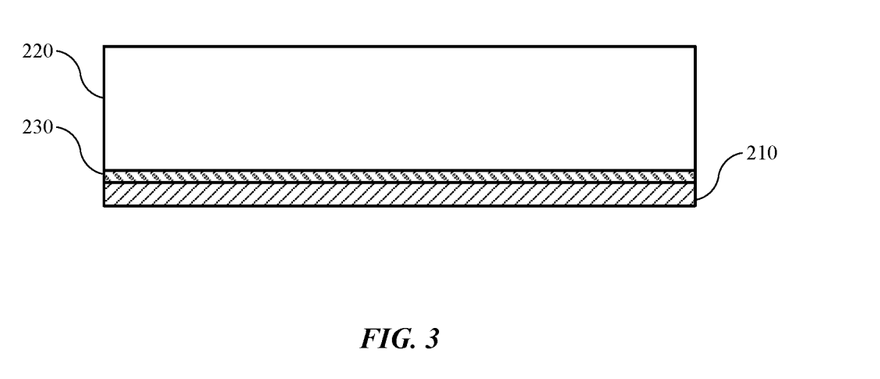
FIG. 3 shows a schematic cross-sectional view of an electrode according to some embodiments of the present technology.

FIG. 2 illustrates a simplified view of an electrode according to the present technology, and may illustrate a current collector 210 and associated active material 220 of an electrode. The current collector may be any known form factors such as a foil, mesh, foam, woven or non-woven fiber, as well as any other form factor. The illustrated electrode may be utilized either as a cathode or anode electrode depending on the materials used and the potential at which it is operated, and it is to be understood that the materials may be any of the materials discussed throughout this disclosure. As noted above, this alkaline environment may produce a passivation layer, such as an oxide, on the current collector. FIG. 3 may illustrate the same electrode after it is introduced into the alkaline electrolyte, or subsequent formation of passivation layer 230, which may be pre-formed prior to disposition of the active material 220 on the current collector.

The passivation layer may affect operation of the cell as well as protect the current collector from further corrosion. Copper may be used in a number of cell designs utilizing an aqueous electrolyte for the cathode current collector. However, copper may quickly corrode in an alkaline environment, such as at a pH of 15 or above, and the formed oxide may be eroded during cycling, which may limit the operation of the cell as a rechargeable battery. Accordingly, in some embodiments, current collectors according to the present technology may be characterized by improved corrosion resistance relative to copper. The current collectors may include a number of conductive materials that may be or include certain metals characterized by reduced corrosion in an alkaline environment, such as including the electrolytes described above.

Corrosion characteristics may be stated in a number of ways including based on a current developed at a particular voltage in electrolytes according to the present technology. The corrosion current may signify the rate at which corrosion may occur, and thus the present technology may utilize materials for the cathode current collector characterized by a corrosion current that may be much less than conventional technologies. For example, under operating conditions as noted below, copper current collectors may corrode at a current of over 100 mA/cm$^2$, and thus cathode current collectors according to some embodiments of the present technology may be characterized by a corrosion current of less than or about 100 mA/cm$^2$, and may be characterized by a corrosion current of less than or about 90 mA/cm$^2$, less than or about 80 mA/cm$^2$, less than or about 70 mA/cm$^2$, less than or about 60 mA/cm$^2$, less than or about 50 mA/cm$^2$, less than or about 40 mA/cm$^2$, less than or about 30 mA/cm$^2$, less than or about 20 mA/cm$^2$, less than or about 10 mA/cm$^2$, less than or about 5 mA/cm$^2$, less than or about 2 mA/cm$^2$, less than or about 1 mA/cm$^2$, less than or about 0.5 mA/cm$^2$, less than or about 0.1 mA/cm$^2$, less than or about 0.01 mA/cm$^2$, or less.

The linear corrosion of cathode current collectors under operating conditions may be less than or about 100 μm/year, and may less than or about 50 μm/year, less than or about 40 μm/year, less than or about 30 μm/year, less than or about 20 μm/year, less than or about 10 μm/year, less than or about 5 μm/year, less than or about 1 μm/year, less than or about 500 nm/year, less than or about 100 nm/year, less than or about 50 nm/year, less than or about 10 nm/year, or less. For any of the materials described throughout this disclosure, additional modifications may be performed to reduce the corrosion current under operating conditions. For example, the current collector made of any of the noted materials may be coated to have a controlled oxidation amount as discussed above, and which may be produced prior to introduction to the cell to limit the oxide thickness. Additionally, a precipitation coating or anodization may be produced. Additionally, an alloy may be formed for the current collector of any combination of noted materials, which may produce doping that can further limit the current collector corrosion current.

For example, certain metals may provide these corrosion characteristics under operating potential in alkaline environments. Conditions may include operating voltages relative to a standard electrode of between about −1 V and about 0.5 V at a rate of about 100 mV/s in a potassium hydroxide electrolyte characterized by a molarity of 9 or greater. The conditions described throughout may be relative to an Hg/HgO reference. Under these or similar operating conditions, metals such as copper, molybdenum, lead, tungsten, and zinc may produce a corrosion current of greater than 100 mA/cm$^2$. Additionally, materials including cobalt, nickel, niobium, and silver may corrode at lower rates, but may still corrode at currents between about 4 mA/cm$^2$ and about 20 mA/cm$^2$. Other metals may less readily corrode, such as iron, titanium, rhodium, platinum, gold, tin, indium, tantalum, magnesium, and yttrium, which all produce a corrosion current below 2 mA/cm$^2$ at the noted operating conditions between −1 V and 0.5 V at a rate of 100 mV/s in a potassium hydroxide electrolyte characterized by a molarity of 9 or greater, with magnesium and yttrium producing no measurable corrosion current at the operating conditions. Any of these materials may be used as exemplary current collectors for a cathode in some embodiments. The materials may be used in combinations, which may reduce costs associated with the material, such as by alloying or plating a more expensive metal on a less expensive substrate, which could include any other metal as well as conductive polymers or other conductive materials.

The materials may not be stable at the alkaline conditions of the electrolyte, and may form a passivation layer as discussed above. The passivation layer, whether pre-formed or formed in situ, may be a stable ceramic layer over the base metal as illustrated in FIG. 3, and may include any number of additives. For example, additional ions may be incorporated within the electrolyte, which may adjust the passivation layer formed. The additional ions that may be incorporated within the passivation layer may include other oxides or hydroxides, such as copper hydroxide, for example, as well as other halides such as fluorides, chlorides, or bromides, along with amides, nitrides, phosphates, or other materials that may improve the passivation layer and/or suppress side reactions that may otherwise occur.

The tuned passivation layer may enable thinner passivation layers than may naturally occur upon exposure to the electrolyte, and may produce more conformal, stable, less reactive, and/or lower resistance coatings. With the passivation layer according to some embodiments of the present technology, current collectors according to some embodiments of the present technology may be stable at pH conditions above 7 within the cell environment, and may be stable at conditions that may be basic, and may include pH conditions discussed above based on the electrolyte concentration, which may be up to or greater than a pH of 9, up to or greater than a pH of 10, up to or greater than a pH of 11, up to or greater than a pH of 12, up to or greater than a pH of 13, up to or greater than a pH of 14, up to or greater than a pH of 15, up to or greater than a pH of 16, up to or greater than a pH of 17, up to or greater than a pH of 18, or higher.

During charging and discharging operations of a secondary or rechargeable battery including any of these materials, the current collector may operate as a nucleation site at which deposition in the form of plating and removal in the form of stripping may occur. For example, at the cathode, copper may be incorporated within the manganese active material. At the cathode where manganese may be utilized in the active material, the main reaction occurring may include a transition between manganese dioxide and manganese hydroxide. However, the activation energy of this reaction may be relatively high, which may favor alternative reactions, and which may promote gas generation or other disfavored reactions that may affect dendrite growth, or alternative formation structures. When copper is present within the active material as well, the activation energy may be reduced with intermediate development of copper-containing materials, which may facilitate the reactions as well as repeatability in charging and recharging operations during cell cycling.

Figure 4:
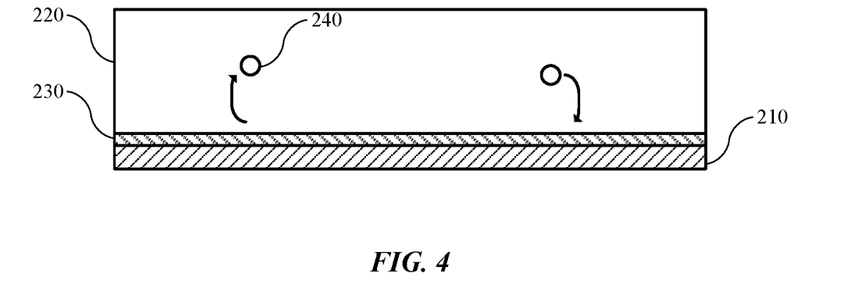
FIG. 4 shows a schematic cross-sectional view of an electrode according to some embodiments of the present technology.

The copper utilized in the reaction may form on the current collector and may plate and strip as the cell is charged or discharged. FIG. 4 illustrates an exemplary electrode in which copper ions 240 may be plated and stripped on the current collector during cycling of the cell. The metal substrate of the current collector may affect the kinetics of the metal nucleation and deposition, and may affect the rate and ease of plating and stripping. As the reaction slows, the activation barriers may be higher, and the slower reaction may interfere with operation of the cell, such as by improving the rate of more thermodynamically favorable reactions, such as side reactions or gas generation, for example.

The rate at which copper is plated to and stripped from the current collector may also be measured as a current, which may signify the speed at which the reaction may occur at a given overpotential. As the current increases, the reaction may occur more favorably and efficiently, improving the operation of the cell. Accordingly, in some embodiments, current collector materials may be characterized by a copper stripping and/or plating current of greater than or about 0.01 mA/cm$^2$ at a voltage between about −0.8 V and about −0.1 V at a rate of 100 mV/s in a potassium hydroxide electrolyte characterized by a molarity of 9 or greater, and may be characterized by a stripping and/or plating current of greater than or about 0.02 mA/cm$^2$, greater than or about 0.03 mA/cm$^2$, greater than or about 0.04 mA/cm$^2$, greater than or about 0.05 mA/cm$^2$, greater than or about 0.1 mA/cm$^2$, greater than or about 0.2 mA/cm$^2$, greater than or about 0.4 mA/cm$^2$, greater than or about 0.8 mA/cm$^2$, greater than or about 1 mA/cm$^2$, greater than or about 3 mA/cm$^2$, greater than or about 5 mA/cm$^2$, greater than or about 10 mA/cm$^2$, greater than or about 20 mA/cm$^2$, greater than or about 50 mA/cm$^2$, greater than or about 75 mA/cm$^2$, greater than or about 100 mA/cm$^2$, or greater.

The current collector materials may also be characterized by an electrical conductivity of greater than or about 0.001 S/cm, and may be characterized by a conductivity of greater than or about 0.005 S/cm, greater than or about 0.01 S/cm, greater than or about 0.05 S/cm, greater than or about 0.1 S/cm, greater than or about 0.2 S/cm, greater than or about 0.5 S/cm, or higher.

The material for an anode current collector may similarly be selected to reduce detrimental corrosion as well as to improve zinc or other anode active material stripping and/or plating. The anode current collectors may also be in any of the form factors previously noted, and may be characterized by any of the electrical conductivities described above. Materials used for anode current collectors may overlap materials that may be selected for cathode current collectors, although many materials may operate less effectively at one or the other electrode potential. For example, indium may be characterized by beneficial corrosion resistance at the cathode where the corrosion current may be about 0.1 mA/cm$^2$, however at the anode indium may be characterized by a higher corrosion current where the corrosion current may be greater than 75 mA/cm$^2$, and may be less suitable as an electrode current collector for some embodiments of the present technology. Similarly, where tin used as a cathode current collector may be characterized by a corrosion current of about 0.3 mA/cm$^2$, the same material used as an anode current collector may be characterized by a corrosion current of greater than 135 mA/cm², and may not be suitable as an electrode current collector at the anode in some embodiments.

Similar to the cathode current collectors, anode current collectors according to some embodiments of the present technology may be characterized by a corrosion current of less than or about 100 mA/cm² at a voltage of between about −1.5 V and about −0.9 V at a rate of 100 mV/s in a potassium hydroxide electrolyte characterized by a molarity of 9 or greater, and may be characterized by a corrosion current of less than or about 90 mA/cm², less than or about 80 mA/cm², less than or about 70 mA/cm², less than or about 60 mA/cm², less than or about 50 mA/cm², less than or about 40 mA/cm², less than or about 30 mA/cm², less than or about 20 mA/cm², less than or about 10 mA/cm², less than or about 5 mA/cm², less than or about 2 mA/cm², less than or about 1 mA/cm², less than or about 0.5 mA/cm², less than or about 0.1 mA/cm², less than or about 0.05 mA/cm², less than or about 0.01 mA/cm², less than or about 0.005 mA/cm², less than or about 0.001 mA/cm², less than or about 0.0005 mA/cm², less than or about 0.0001 mA/cm², or less. At these operating conditions, the linear corrosion may be less than or about 10 mm/year, and may be less than or about 5 mm/year, less than or about 1 mm/year, less than or about 500 μm/year, less than or about 100 μm/year, and may less than or about 50 μm/year, less than or about 40 μm/year, less than or about 30 μm/year, less than or about 20 μm/year, less than or about 10 μm/year, less than or about 5 μm/year, less than or about 1 μm/year, less than or about 500 nm/year, less than or about 100 nm/year, less than or about 50 nm/year, less than or about 10 nm/year, or less Accordingly, certain metals may provide these corrosion characteristics under operating potential in alkaline environments. Conditions may include operating voltages relative to a standard electrode of between about −1.5 V and about −0.9 V at a rate of about 100 mV/s in a potassium hydroxide electrolyte characterized by a molarity of 9 or greater. Under these or similar operating conditions, metals such as niobium, iron, vanadium, and rhodium may corrode at lower rates than tin and indium, but may still corrode at currents between about 1 mA/cm² and about 20 mA/cm². Other metals may less readily corrode, such as platinum, titanium, cobalt, molybdenum, nickel, lead, silver, gold, copper, magnesium, tantalum, tungsten, and yttrium, which all produce a corrosion current below 1 mA/cm², with many producing no measureable corrosion current at the operating conditions. Any of these materials may be used as exemplary current collectors for an anode in some embodiments. The materials may be used in combinations, which may reduce costs associated with the material, such as by alloying or plating a more expensive metal on a less expensive substrate, which could include any other metal, as well as conductive polymers or other conductive materials.

Similar to the copper plating and stripping characteristics at the cathode, zinc plating and stripping at the anode may be improved over conventional materials. In some embodiments, current collector materials may be characterized by a zinc stripping and/or plating current of greater than or about 0.01 mA/cm² at voltages between about −1.5 V to about −0.9 V at a rate of about 100 mV/s in a potassium hydroxide electrolyte characterized by a molarity of 9 or greater, and may be characterized by a stripping and/or plating current of greater than or about 0.05 mA/cm², greater than or about 0.1 mA/cm², greater than or about 0.2 mA/cm², greater than or about 0.4 mA/cm², greater than or about 0.8 mA/cm², greater than or about 1 mA/cm², greater than or about 3 mA/cm², greater than or about 5 mA/cm², greater than or about 10 mA/cm², greater than or about 20 mA/cm², greater than or about 50 mA/cm², greater than or about 75 mA/cm², greater than or about 100 mA/cm², greater than or about 150 mA/cm², greater than or about 200 mA/cm², greater than or about 250 mA/cm², greater than or about 300 mA/cm², greater than or about 350 mA/cm², greater than or about 400 mA/cm², greater than or about 450 mA/cm², greater than or about 500 mA/cm², or greater.

Many of the materials discussed above with respect to the cathode current collector may be operated in a range of voltages that may be around or less than the onset voltage for oxygen evolution at the cathode. However, at the anode, hydrogen gas evolution may occur within the operating range of voltages, and thus materials for the anode may be selected to limit or reduce hydrogen gas generation at the anode. Materials listed above that may operate effectively with regard to corrosion resistance and/or zinc plating or stripping may perform less suitably with regard to hydrogen evolution, and may catalyze hydrogen evolution at the anode. For example, materials including gold, cobalt, iron, molybdenum, nickel, platinum, rhodium, tin, vanadium, and tungsten may all catalyze hydrogen evolution more than conventional copper or brass anode current collectors. Other materials from those discussed above may improve on hydrogen evolution, and may be characterized by an evolution current under operating conditions below copper, which may be characterized by a hydrogen evolution current above about 25 mA/cm² at a voltage of about −1.5 V at a rate of about 100 mV/s in a potassium hydroxide electrolyte characterized by a molarity of 9 or greater. For example, niobium, titanium, silver, indium, tantalum, lead, magnesium, and yttrium may all be characterized by an evolution current below about 10 mA/cm², and magnesium and yttrium may produce no measurable hydrogen under operating conditions in some embodiments. In some embodiments of the present technology the material utilized may be characterized by a hydrogen evolution current density at about −1.4 V vs a standard hydrogen electrode below or about 20 mA/cm², and may be characterized by a hydrogen evolution current density at the stated conditions of below or about 10 mA/cm², below or about 5 mA/cm², below or about 1 mA/cm², below or about 0.5 mA/cm², below or about 0.1 mA/cm², below or about 0.05 mA/cm², below or about 0.01 mA/cm², below or about 0.005 mA/cm², below or about 0.001 mA/cm², below or about 0.0005 mA/cm², below or about 0.0001 mA/cm², or less. These materials may be naturally poor catalysts for hydrogen evolution, or may passivate to limit the reaction under operating conditions.

Similar to the cathode current collectors, the anode current collectors may form a ceramic passivation layer, which may be pre-formed or developed in situ, and which may include any of the additive materials described above. By utilizing cathode and/or anode current collectors in cells according to some embodiments of the present technology, improved performance or cycling may be provided by reducing corrosion of current collectors, reducing gas evolution, maintaining plating and stripping characteristics, or reducing side reactions occurring in conventional technologies.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A rechargeable battery comprising:
   a first current collector comprising a material characterized by a maximum corrosion current in an aqueous electrolyte below or about 2 mA/cm2 at a voltage between about −0.8 V to about 0.5 V and a rate of about 100 mV/s, wherein the first current collector comprises a ceramic overlying a metal;
   a cathode material coupled with the first current collector, wherein the cathode material is coupled with the ceramic of the first current collector;
   a second current collector;
   an anode material coupled with the second current collector; and
   an aqueous electrolyte characterized by a pH greater than or about 14.

2. The rechargeable battery of claim 1, wherein the first current collector comprises a material selected from the group consisting of magnesium, tin, yttrium, tantalum, and indium.

3. The rechargeable battery of claim 1, wherein the anode material comprises a zinc-containing material, and wherein the cathode material comprises a manganese-containing material, a nickel-containing material, or a silver-containing material.

4. The rechargeable battery of claim 3, wherein the cathode material further comprises copper.

5. The rechargeable battery of claim 4, wherein the first current collector is characterized by a copper stripping current in the aqueous electrolyte greater than or about 0.01 mA/cm2 at a voltage of about −0.1 V and a rate of about 100 mV/s.

6. The rechargeable battery of claim 1, further comprising a KOH solution as the aqueous electrolyte of the battery, wherein the KOH solution is characterized by a pH of greater than or about 14.

7. The rechargeable battery of claim 1, wherein the first current collector comprises indium, and wherein the second current collector comprises yttrium.

8. The rechargeable battery of claim 1, wherein the second current collector comprises a material selected from the group consisting of lead, copper, magnesium, niobium, yttrium, tantalum, and silver.

9. The rechargeable battery of claim 1, wherein the second current collector is characterized by a hydrogen evolution current in the aqueous electrolyte below or about 50 mA/cm2.

10. The rechargeable battery of claim 1, wherein the second current collector is characterized by a maximum corrosion current in the aqueous electrolyte below or about 20 mA/cm2.

11. The rechargeable battery of claim 1, wherein the second current collector is characterized by a zinc stripping current in the aqueous electrolyte greater than or about 0.1 mA/cm2.

12. The rechargeable battery of claim 1, wherein the first current collector or the second current collector comprises a first material alloyed with or plated on a second material.

13. A battery cell comprising:
    a first current collector;
    a cathode material coupled with the first current collector;
    a second current collector comprising a material characterized by a maximum corrosion current in an aqueous electrolyte below or about 20 mA/cm2 at a voltage between about −1.5 V to about −0.9 V at a rate of about 100 mV/s, wherein the second current collector comprises a ceramic overlying a metal;
    an anode material coupled with the second current collector, wherein the anode material is coupled with the ceramic of the second current collector; and
    an aqueous electrolyte characterized by a pH greater than or about 14.

14. The battery cell of claim 13, wherein the second current collector comprises a material selected from the group consisting of lead, copper, magnesium, niobium, yttrium, tantalum, and silver.

15. The battery cell of claim 13, wherein the second current collector is characterized by a hydrogen evolution current in the aqueous electrolyte below or about 10 mA/cm2.

16. The battery cell of claim 13, wherein the second current collector is characterized by a zinc plating current in the aqueous electrolyte greater than or about 0.4 mA/cm2 at a voltage between about −1.5 V and about −0.9 V at a rate of 100 mV/s.

17. The battery cell of claim 13, wherein the first current collector comprises a material selected from the group consisting of magnesium, tin, yttrium, tantalum, and indium.

18. The battery cell of claim 13, wherein the aqueous electrolyte comprises a KOH solution including one or more additives selected from the group consisting of oxides, hydroxides, fluorides, chlorides, bromides, amides, nitrides, or phosphates.

19. A battery cell comprising:
    a first current collector characterized by a maximum corrosion current in an aqueous electrolyte below or about 2 mA/cm2 at a voltage between about −0.8 V to about 0.5 V and a rate of about 100 mV/s, wherein the first current collector comprises a ceramic overlying a metal, and wherein the ceramic includes copper hydroxide;

a cathode material coupled with the first current collector, wherein the cathode material is coupled with the ceramic of the first current collector;

a second current collector comprising a material characterized by a hydrogen evolution current in the aqueous electrolyte below or about 50 mA/cm2 at a voltage between about −1.5 V and about −0.9 V at a rate of 100 mV/s;

an anode material coupled with the second current collector; and an aqueous electrolyte characterized by a pH greater than or about 14.

20. The battery cell of claim 19, wherein the first current collector comprises a material selected from the group consisting of magnesium, tin, yttrium, tantalum, gold, and indium, and wherein the second current collector comprises a material selected from the group consisting of lead, copper, magnesium, niobium, yttrium, tantalum, and silver.

* * * * *